US012484949B2

United States Patent
Chen et al.

(10) Patent No.: US 12,484,949 B2
(45) Date of Patent: Dec. 2, 2025

(54) ISOLATION GUIDE FOR A CRYOABLATION CATHETER

(71) Applicant: Medtronic Ireland Manufacturing Unlimited Company, Dublin (IE)

(72) Inventors: Claire S. Chen, San Francisco, CA (US); Carlos H. Lima, Santa Rosa, CA (US); Leonila Rivera, Windsor, CA (US)

(73) Assignee: Medtronic Ireland Manufacturing Unlimited Company, Dublin (IE)

( * ) Notice: Subject to any disclaimer, the term of this patent is extended or adjusted under 35 U.S.C. 154(b) by 306 days.

(21) Appl. No.: 18/451,275

(22) Filed: Aug. 17, 2023

(65) Prior Publication Data
US 2024/0090933 A1    Mar. 21, 2024

Related U.S. Application Data

(60) Provisional application No. 63/376,571, filed on Sep. 21, 2022.

(51) Int. Cl.
*A61B 18/02*    (2006.01)
*A61B 17/00*    (2006.01)
*A61B 18/00*    (2006.01)

(52) U.S. Cl.
CPC .... *A61B 18/02* (2013.01); *A61B 2017/00526* (2013.01); *A61B 2018/00059* (2013.01);
(Continued)

(58) Field of Classification Search
CPC .......... A61B 18/02; A61B 2017/00526; A61B 2018/00059; A61B 2018/00577;
(Continued)

(56) References Cited

U.S. PATENT DOCUMENTS 7,862,563 B1    1/2011   Cosman et al.
8,728,074 B2    5/2014   West et al.
(Continued)

FOREIGN PATENT DOCUMENTS

WO    2013162700 A1    10/2013
WO    2022134714 A1    6/2022

OTHER PUBLICATIONS

European Patent Office Extended Search Report for Application No. 23197381.9 dated Feb. 19, 2024 (11 pages).

*Primary Examiner* — Ankit D Tejani
*Assistant Examiner* — Joshua Brendon Solomon
(74) *Attorney, Agent, or Firm* — Michael Best & Friedrich LLP (57) ABSTRACT

A cryoablation catheter includes an inner lumen and an inflatable balloon surrounding the inner lumen. An inflow pipe is disposed within the inflatable balloon and is configured to introduce a refrigerant into the balloon. A thermocouple wire is disposed within the inflatable balloon and positioned adjacent the inflow pipe. The thermocouple wire is configured to measure an internal temperature of the balloon. The cryoablation catheter further includes an isolation guide disposed within the inflatable balloon. The isolation guide includes a central bore configured to receive the inner lumen, an inflow bore configured to receive the inflow pope, and a thermocouple bore configured to receive the thermocouple wire. The thermocouple bore is spaced from the inflow bore along the isolation guide.

20 Claims, 9 Drawing Sheets

(52) U.S. Cl.
CPC .............. *A61B 2018/00577* (2013.01); *A61B 2018/00821* (2013.01); *A61B 2018/0212* (2013.01); *A61B 2018/0262* (2013.01)

(58) Field of Classification Search
CPC .. A61B 2018/00821; A61B 2018/0212; A61B 2018/0262; A61B 2018/00053; A61B 2018/00166; A61B 2018/0022; A61B 2018/00714; A61B 2018/00791
See application file for complete search history.

(56) References Cited

U.S. PATENT DOCUMENTS

| | | |
|---|---|---|
| 9,913,687 B2 | 3/2018 | Brannan et al. |
| 10,959,775 B2 | 3/2021 | Cosman |
| 2002/0087156 A1 | 7/2002 | Maguire et al. |
| 2015/0045863 A1 | 2/2015 | Litscher et al. |
| 2015/0088113 A1* | 3/2015 | Clark .................... A61B 18/02 606/21 |
| 2015/0282859 A1 | 10/2015 | Bencini et al. |
| 2019/0183557 A1 | 6/2019 | Jung, Jr. |
| 2020/0085482 A1 | 3/2020 | Buchbinder et al. |
| 2020/0085483 A1 | 3/2020 | Tegg et al. |
| 2020/0085484 A1 | 3/2020 | Tegg et al. |
| 2020/0197088 A1 | 6/2020 | Vrba et al. |
| 2021/0290284 A1 | 9/2021 | Guggenberger et al. |
| 2022/0071680 A1 | 3/2022 | Pham et al. |

* cited by examiner

ISOLATION GUIDE FOR A CRYOABLATION CATHETER

CROSS-REFERENCE TO RELATED APPLICATIONS

This application claims priority to U.S. Provisional Application No. 63/376,571, filed Sep. 21, 2022, the entire contents of which are hereby incorporated by reference.

FIELD

The present technology is generally related to cryoablation catheters.

BACKGROUND

Renal denervation and similar balloon cryotherapies are performed by inflating a balloon with a refrigerant to remove heat from surrounding tissues. The balloon is supported by a catheter which provides the refrigerant to the balloon to perform the therapy. Introduction of the refrigerant to the balloon causes the balloon to expand, and the temperature within the balloon is monitored throughout the therapy process.

SUMMARY

The techniques of this disclosure generally relate to the use of a radiopaque isolation guide within the balloon of a cryoablation catheter. The isolation guide isolates an inflow pipe and at least one sensor (e.g., thermocouple wire, pressure monitor tube, and/or other sensor), and reduces or eliminates the need for heat shrink material and markerbands. The isolation guide may be made at least partially of a radiopaque material (gold, platinum, iridium, or other sufficient radiopaque materials) to compensate for the removal of the markerbands.

In one aspect, the present disclosure provides a cryoablation catheter including an inner lumen and an inflatable balloon surrounding the inner lumen. An inflow pipe is disposed within the inflatable balloon and is configured to introduce a refrigerant into the balloon. A thermocouple wire is disposed within the inflatable balloon and is positioned adjacent the inflow pipe. The thermocouple wire is configured to measure an internal temperature of the balloon. The cryoablation catheter further includes an isolation guide disposed within the inflatable balloon. The isolation guide includes a central bore configured to receive the inner lumen, an inflow bore configured to receive the inflow pipe, and a thermocouple bore configured to receive the thermocouple wire. The thermocouple bore is spaced from the inflow bore along the isolation guide.

In another aspect, the disclosure provides a method of manufacturing a cryoablation catheter. The method includes inserting an inner lumen into a central bore of an isolation guide, inserting an inflow pipe into an inflow bore of the isolation guide, the inflow pipe including a plurality of radially extending inflow ports, inserting a thermocouple wire into a thermocouple bore of the isolation guide, the thermocouple wire having a measuring tip configured to measure a temperature, positioning the isolation guide such that the plurality of inflow ports and the measuring tip are positioned outside of the isolation guide, and securing the isolation guide relative to the inner lumen, the inflow pipe, and the thermocouple wire.

In another aspect, the disclosure provides an isolation guide for a cryoablation catheter. The isolation guide includes a prismatic outer profile including a first axial end face and a second axial end face. The second axial end face is disposed opposite the first axial end face. A central bore extends between the first axial end face and the second axial end face. The central bore is configured to receive an inner lumen of the cryoablation catheter therein. An inflow bore extends between the first axial end face and the second axial end face. The inflow bore is configured to receive an inflow pipe of the cryoablation catheter therein. A sensor bore extends between the first axial end face and the second axial end face. The sensor bore is spaced from the inflow bore so as not to intersect the inflow bore, and the sensor bore is configured to receive a sensor of the cryoablation catheter therein.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Figure 1:
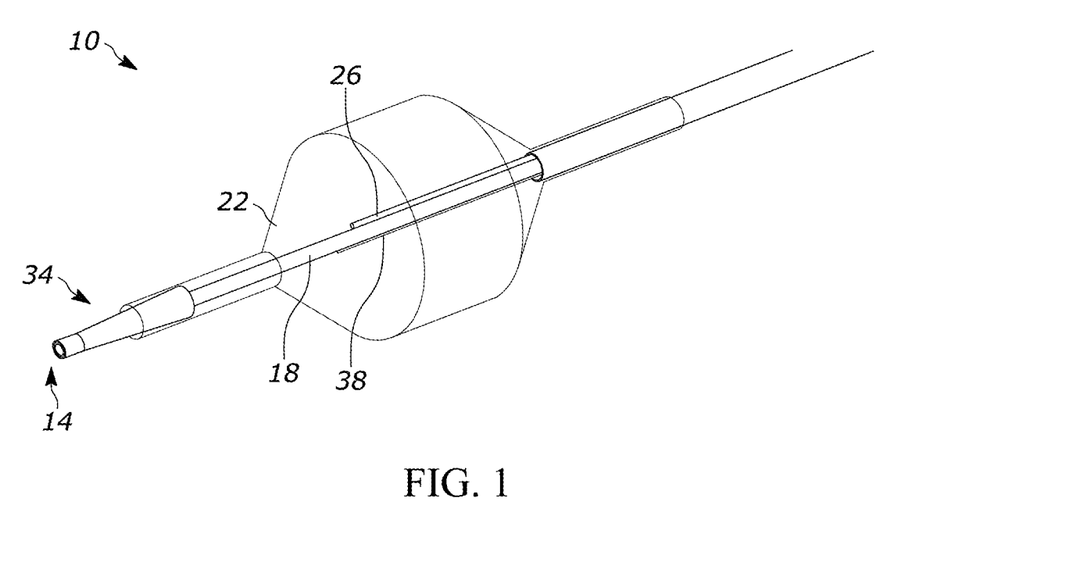
FIG. 1 is a perspective view of a distal end of a cryoablation catheter according to one example, with an isolation guide not shown.
Figure 1A:
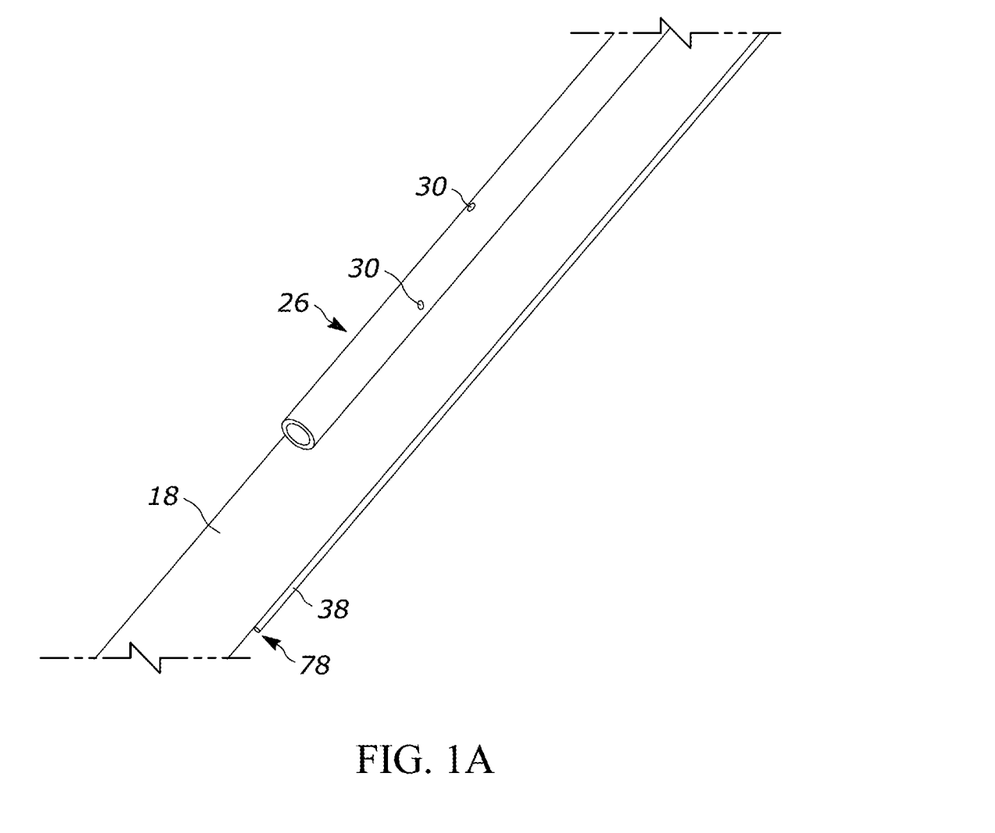
FIG. 1A is a close-up perspective view of the cryoablation catheter of FIG. 1, with a balloon not shown.

With reference to FIG. 1, a medical device, illustrated as a cryoablation catheter 10, includes a distal end 14 sized to be inserted into the vasculature of a patient and a proximal end (not shown) to be engaged and controlled by an operator. The distal end 14 includes an inner lumen 18 surrounded in part by a balloon 22 that is selectively inflatable to perform cryoablation therapy. The catheter 10 delivers a refrigerant to the balloon 22 to inflate and cool the balloon 22 during the cryoablation therapy. An inflow pipe 26 for introducing the refrigerant is disposed within the catheter 10 and extends to a position within the balloon 22. The inflow pipe 26 includes a plurality of inflow ports 30 (FIG. 1A) that deliver the refrigerant to a volume of space within the balloon 22 during use. The inflow ports 30 are radial openings in the inflow pipe 26 and direct the refrigerant radially outward toward the balloon 22. The refrigerant flows through the inflow pipe 26 of the catheter 10 as a liquid and undergoes a liquid-gas phase change when passing through the inflow ports 30 and entering the balloon 22. The phase change results in rapid expansion of the now gaseous refrigerant, thereby decreasing the temperature within the balloon 22 and inflating the balloon 22 (e.g., near a distal end 34 of the catheter 10). Due to the delicate nature of a cryoablation therapy, a thermocouple wire 38 is disposed within the balloon 22 to allow for monitoring of the internal temperature of the balloon 22. In some examples, the catheter 10 also includes one or more radiopaque markerbands (not illustrated) that are positioned within or outside of the balloon 22. The radiopaque markerbands allow the distal end 34 of the catheter 10 to be tracked using fluoroscopy while in use for a cryoablation therapy, although as described herein in some examples the number of markerbands are reduced or entirely eliminated from the catheter 10.

Figure 2:
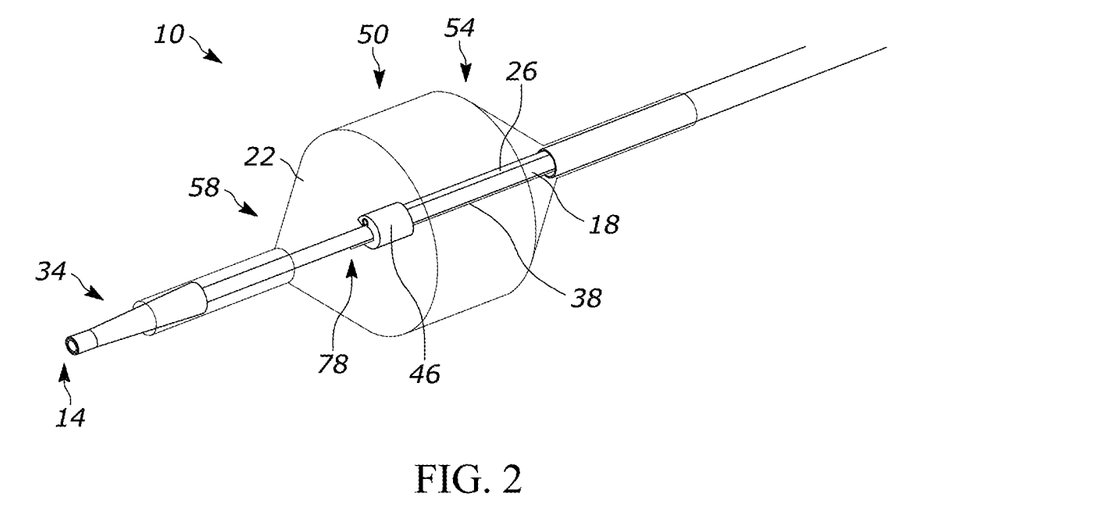
FIG. 2 is a perspective view of the cryoablation catheter of FIG. 1, further including the balloon and the isolation guide.
Figure 4:
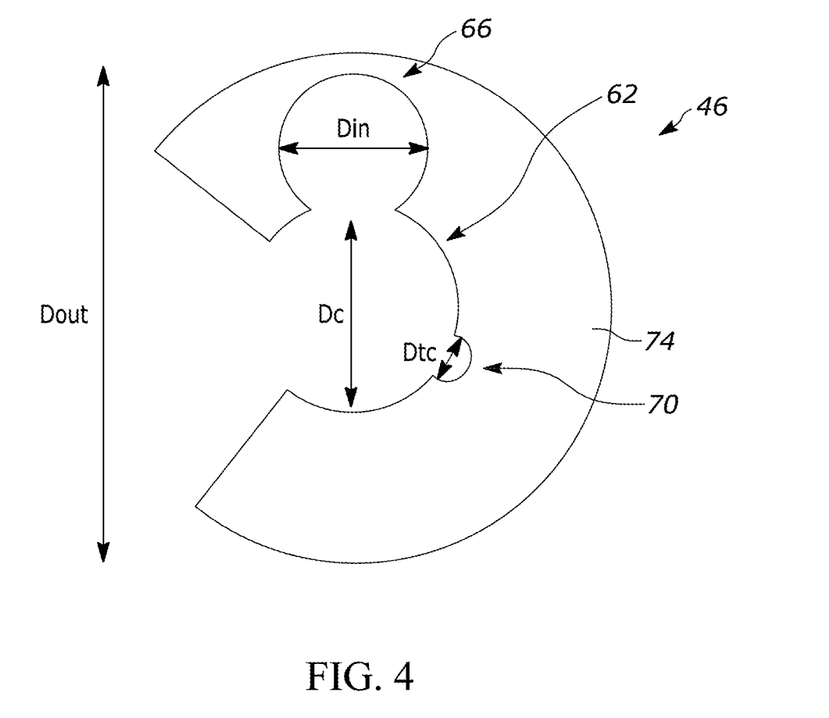
FIG. 4 is a front view of the isolation guide.
Figure 5:
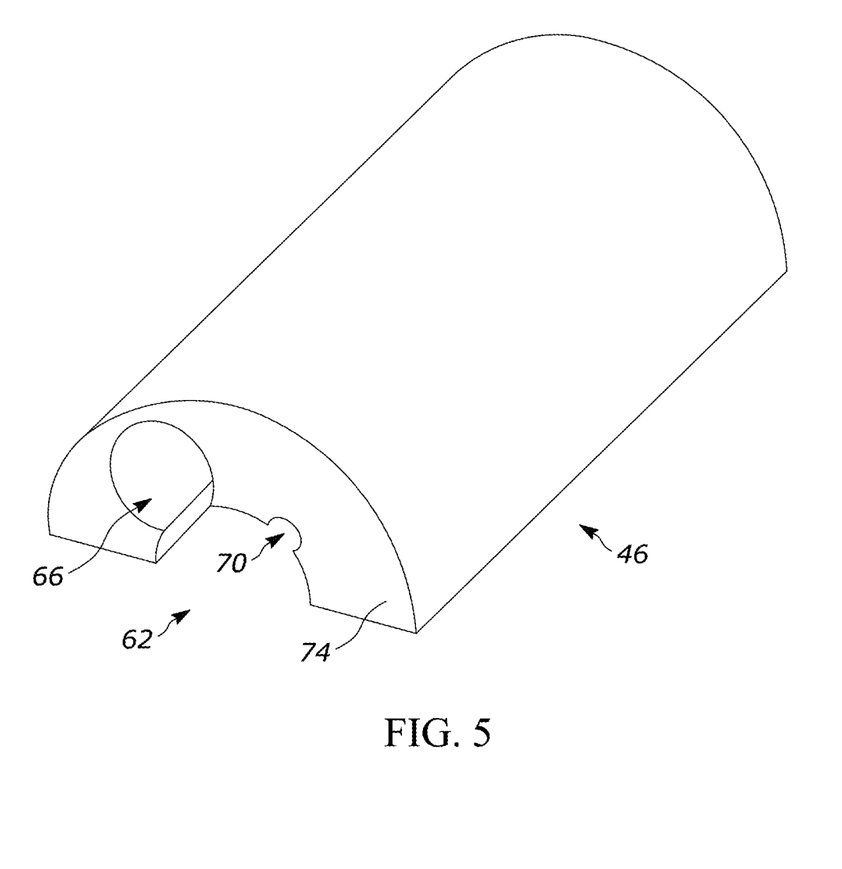
FIG. 5 is a perspective view of an isolation guide in accordance with another example.
Figure 6:
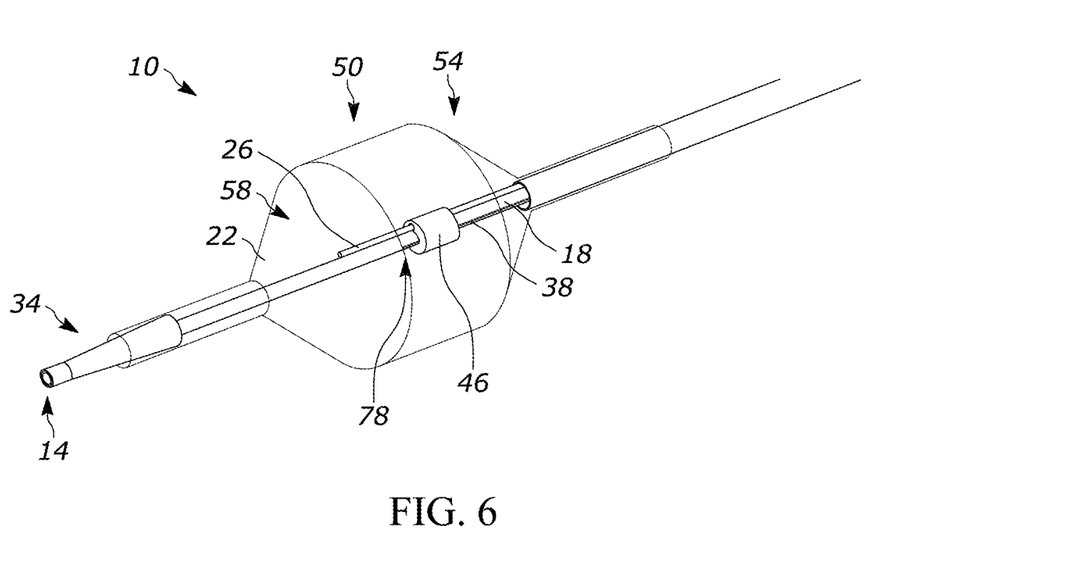
FIG. 6 is a perspective view of the cryoablation catheter, illustrating a different position for the isolation guide than the position illustrated in FIG. 2.
Figure 7:
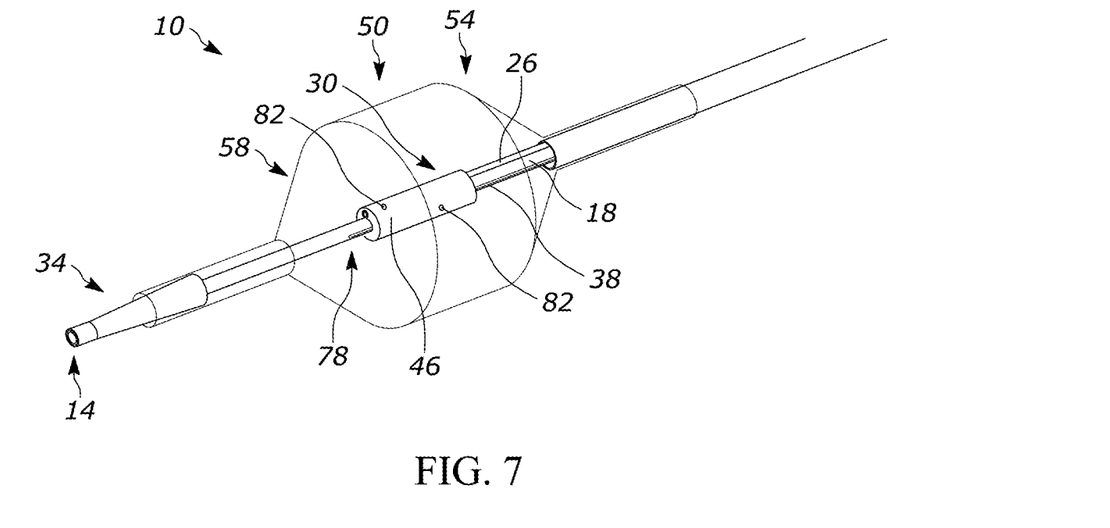
FIG. 7 is a perspective view of the cryoablation catheter, illustrating an isolation guide that extends across a working portion of the balloon and includes additional radially-extending bores.

With reference to FIGS. 2-7, the catheter 10 includes an isolation guide 46 for aligning and securing the inflow pipe 26 and the thermocouple wire 38 relative to the inner lumen 18. The isolation guide 46 aligns and secures the inflow pipe 26 and the thermocouple wire 38, (e.g., without the need for heat shrinking or other securing processes, or with at least a reduced need for heat shrinking or other securing processes). The isolation guide 46 is shaped to ensure proper alignment of the components (e.g., the inflow pipe 26 and the thermocouple wire 38) of the catheter 10. Furthermore, the isolation guide 46 is formed of a radiopaque material to reduce or remove the need for using separate markerbands. The isolation guide 46 may be formed from gold, platinum, iridium, or other radiopaque materials. The isolation guide 46 is positioned within a working portion 50 of the balloon 22 and is secured to the inner lumen 18. As shown in FIGS. 2, 6, and 7, the isolation guide 46 may be located near a proximal end 54 of the balloon 22, a distal end 58 of the balloon 22, or for example extend the length of the working portion 50 of the balloon 22.

Figure 3:
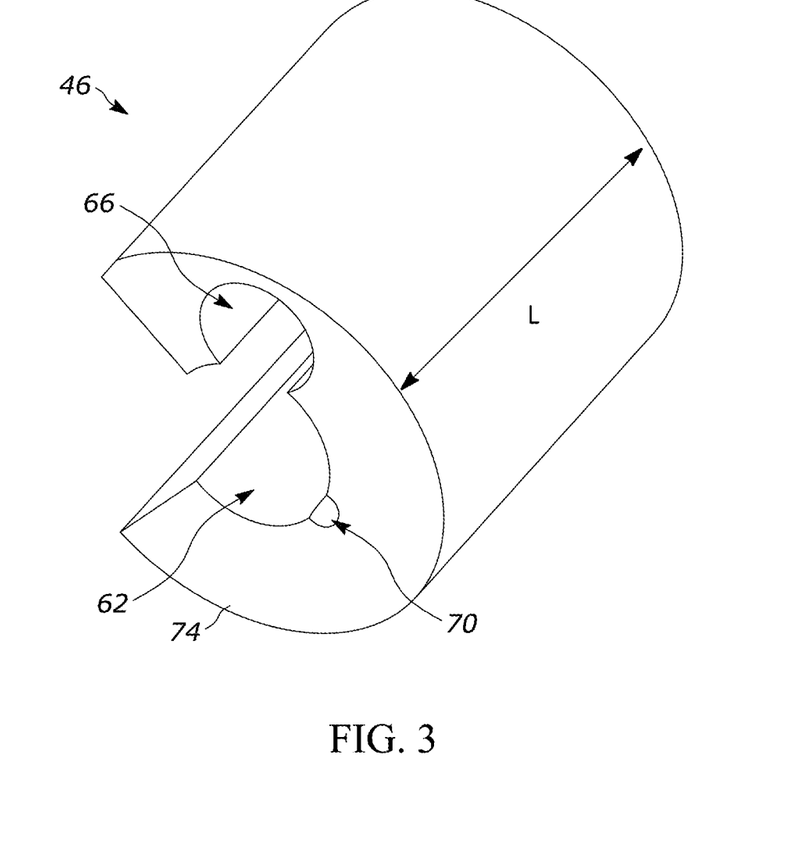
FIG. 3 is a perspective view of the isolation guide.

Referring now to FIGS. 3-5, the isolation guide 46 of the illustrated example has a prismatic outer profile with a plurality of longitudinally extending bores therein. A central bore 62 corresponds to the inner lumen 18, an inflow bore 66 corresponds to the inflow pipe 26, and a thermocouple bore 70 corresponds to the thermocouple wire 38. The thermocouple bore 70 is a sensor bore. Axial end faces 74 of the isolation guide's prismatic outer profile are generally semi-circular. For example, the axial end faces 74 may be a half circle (FIG. 5), the axial end faces 74 may be a three-quarter circle (FIGS. 3-4), or the axial end faces 74 may be anywhere between a half and a three-quarter circle, or less than a half circle, or greater than a three-quarter circle but less than a full circle. The central bore 62 is generally circular in cross-section, extends the length of the isolation guide 46, and is positioned so that a center of the central bore 62 is aligned with a center of the axial end face 74 of the isolation guide 46. In other examples the central bore 62, the inflow bore 66, and/or the thermocouple bore 70 has a different shape than that illustrated (e.g., non-circular). In the illustrated example, the cross-section of the central bore 62 is similar to that of the isolation guide 46. For example, if the axial end faces 74 of the isolation guide 46 are half-circles, the cross-section of the central bore 62 is also a half-circle (FIG. 5).

With continued reference to FIGS. 3-5, an inner diameter Dc of the central bore 62 is sized so that the inner lumen 18 fits within the central bore 62. In some examples, the inner lumen 18 has an outer diameter that is equal to, or substantially equal to (e.g., within 10% of), the inner diameter Dc. The inner lumen 18 may fit tightly within the central bore 62 (e.g., in frictional engagement). In some examples, the inner lumen 18 may have an outer diameter that is larger than, or smaller than, the inner diameter Dc.

The inflow bore 66 and the thermocouple bore 70 are spaced angularly apart along the circumference of the isolation guide 46 to prevent the inflow pipe 26 and the thermocouple wire 38 from coming into contact with one another. An inner diameter Din of the inflow bore 66 is sized to receive the inflow pipe 26 therein, and an inner diameter Dtc of the thermocouple bore 70 is sized to receive the thermocouple wire 38 therein. The outer diameters of the inflow pipe 26 and the thermocouple wire 38 may be equal to, or substantially equal to (e.g., within 10% of), the corresponding inner diameters Din and Dtc. The inflow pipe 26 and the thermocouple wire 38 may fit tightly within the inflow bore 66 and the thermocouple bore 70 (e.g., in frictional engagement). In some examples, the inflow pipe 26 and/or the thermocouple wire 38 may have an outer diameter that is larger than, or smaller than, the corresponding diameter Din, Dtc. In the illustrated example, the diameter Dc is larger than the diameter Din, and the diameter Din is larger than the diameter Dtc.

The inflow bore 66 and the thermocouple bore 70 may be positioned anywhere within the isolation guide 46 so long as they do not intersect, so as to prevent the inflow pipe 26 and the thermocouple wire 38 from touching. If the thermocouple wire 38 were to touch the inflow pipe 26, the thermocouple wire 38 could produce incorrect or fluctuating readings of the internal temperature of the balloon 22 during therapy. In the illustrated example, the inflow bore 66 and the thermocouple bore 70 each extend parallel to the central bore 62, although in other examples the inflow bore 66 and/or the thermocouple bore 70 may not extend parallel to the central bore 62, and/or may not extend parallel to one another.

With reference to FIGS. 3-4, an exemplary isolation guide 46 is sized as follows. The central bore 62 has an inner diameter Dc of 0.022" to fit an inner lumen 18 with an outer diameter between 0.017" and 0.021". The inner diameter Din of the inflow bore 66 is 0.013" to fit an inflow pipe 26 with an outer diameter of between 0.010" and 0.012". The inner diameter Dtc of the thermocouple bore 70 is 0.002" to fit a thermocouple wire 38 having an outer diameter of 0.0013". Finally, an outer diameter Dout of the isolation guide 46 is 0.052" so that the isolation guide 46 is large enough to contain the bores 62, 66, 70. A length L of the isolation guide 46 may be less than a length of the working portion 50 of the balloon 22 and may be, for example, 0.055", or between 0.05" and 0.06", or between 0.04" and 0.07", or between 0.03" and 0.08", or other values and ranges of values.

The illustrated isolation guide 46 includes a central bore 62, an inflow bore 66, and a thermocouple bore 70. In some examples the isolation guide 46 includes a greater number of bores to accommodate further components of a catheter. For example, the isolation guide 46 may include other sensor bores such as a pressure monitor bore to receive a pressure monitor tube therein and/or other sensor bores to receive other sensors therein. In some examples, the thermocouple bore 70 is replaced by a sensor bore for a different sensor (e.g., pressure monitor tube). The various sensor bores of the isolation guide 46 may each be spaced from one another to maintain distances between the sensors received therein, and between the sensors and the inflow pipe 26.

To assemble the cryoablation catheter 10 including the radiopaque isolation guide 46 described above, the inner lumen 18 is inserted into the central bore 62, the inflow pipe 26 is inserted into the inflow bore 66, and the thermocouple wire 38 is inserted into the thermocouple bore 70. The isolation guide 46 is then positioned along the length of the inner lumen 18 such that a measuring tip 78 of the thermocouple wire 38 is disposed outside of the isolation guide 46. Similarly the isolation guide 46 is positioned such that the inflow ports 30 are not blocked by the isolation guide 46. After the isolation guide 46 is properly positioned, the isolation guide 46 may be secured to the inner lumen 18, for example, with an adhesive. FIGS. 2, 6, and 7 illustrate various positions for the isolation guide 46 along the inner lumen 18. For example, FIG. 2 illustrates the isolation guide 46 positioned near the distal end 58 of the balloon 22. The inflow ports 30 are on a proximal side of the isolation guide 46 and the measuring tip 78 of the thermocouple wire 38 is on an opposite, distal side of the isolation guide 46. FIG. 6 illustrates the isolation guide 46 positioned near the proximal end 54 of the balloon 22, and, therefore, the inflow ports 30 and the measuring tip 78 are positioned distal of the isolation guide 46. FIG. 7 illustrates the isolation guide 46 having a length L (FIG. 3) that spans (or substantially spans) the working portion 50 of the balloon 22. In this example, the isolation guide 46 additionally includes a plurality of radially extending bores 82 that are aligned with the inflow ports 30 during assembly, to prevent blocking of the inflow ports 30 and allow the liquid to pass from the inflow ports 30, through the bores 82, and into the balloon 22.

The cryoablation catheter 10, including the radiopaque isolation guide 46 as described above, may create reliable isolation between the inflow pipe 26 and the thermocouple wire 38 after assembly. Furthermore, the isolation guide 46 may provide for consistent placement of the inflow pipe 26 and the thermocouple wire 38 during assembly without requiring the use of heat shrink to secure the inflow pipe 26 and the thermocouple wire 38. Additionally, the radiopaque nature of the isolation guide 46 may reduce or prevent the need for using markerbands on the catheter 10.

Figure 8:
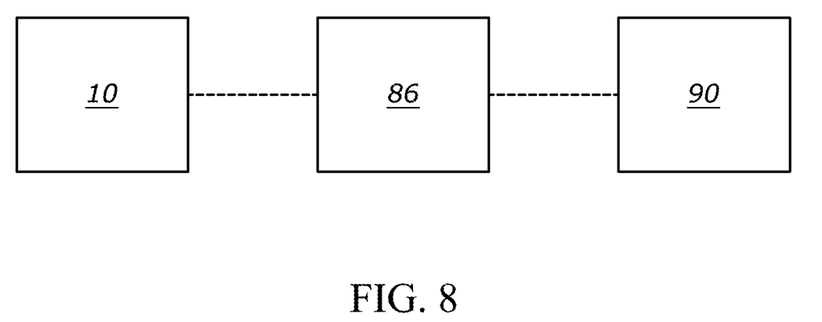
FIG. 8 is a schematic system diagram of the cryoablation catheter.

With reference to FIG. 8, the cryoablation catheter 10 may be used in various settings, and in combination with one or more of a handle 86 and a control device 90. In some examples, the cryoablation catheter 10 includes a proximal end (located opposite the distal end 14 illustrated in FIG. 1) coupled to the handle 86. The handle 86 is coupled to the control device 90 (e.g., with wiring and/or one or more conduits for delivery of the refrigerant). The handle 86 may include one or more valves (e.g., check valves), or other features that control movement of the refrigerant flowing through the inflow pipe 26, and/or control movement of a portion or portions of the cryoablation catheter 10 itself. In some examples, no handle 86 is provided. Instead, the proximal end of the cryoablation catheter 10 is coupled (e.g., directly) to the control device 90. In some examples, the control device 90 is a large, stand-alone reusable console (e.g., with storage for the refrigerant, venting for the refrigerant, a display or monitor, and/or other features). In other examples, the control device 90 is a smaller, reusable console (e.g., without a full display or monitor, but with onboard electronics to control flow of the refrigerant, and with storage for the refrigerant or a connector for connection to a container of refrigerant). In yet other examples, the control device 90 is a disposable, handheld device for use in controlling flow of the refrigerant, and may contain for example a connector for connection to a container of refrigerant.

It should be understood that various aspects disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the techniques). In addition, while certain aspects of this disclosure are described as being performed by a single module or unit for purposes of clarity, it should be understood that the techniques of this disclosure may be performed by a combination of units or modules associated with, for example, a medical device.

Although various aspects and examples have been described in detail with reference to certain examples illustrated in the drawings, variations and modifications exist within the scope and spirit of one or more independent aspects described and illustrated.

What is claimed is:

1. A cryoablation catheter comprising:
   an inner lumen;
   an inflatable balloon surrounding the inner lumen;
   an inflow pipe disposed within the inflatable balloon, the inflow pipe configured to introduce a refrigerant to the balloon;
   a thermocouple wire disposed within the inflatable balloon, the thermocouple wire positioned adjacent the inflow pipe and configured to measure an internal temperature of the balloon; and
   an isolation guide disposed within the inflatable balloon, the isolation guide including a central bore configured to receive the inner lumen, an inflow bore configured to receive the inflow pipe, and a thermocouple bore configured to receive the thermocouple wire, the thermocouple bore spaced from the inflow bore along the isolation guide.

2. The cryoablation catheter of claim 1, wherein the isolation guide includes a prismatic outer profile including a first axial end face and a second axial end face, the second axial end face disposed opposite the first axial end face, wherein the central bore extends between the first axial end face and the second axial end face, wherein the inflow bore extends between the first axial end face and the second axial end face, and wherein the thermocouple bore extends between the first axial end face and the second axial end face.

3. The cryoablation catheter of claim 2, wherein the first axial end face is semi-circular, and wherein the second axial end face is semi-circular.

4. The cryoablation catheter of claim 1, wherein the isolation guide is formed of a radiopaque material.

5. The cryoablation catheter of claim 1, wherein the isolation guide is located near a proximal end of the inflatable balloon.

6. The cryoablation catheter of claim 1, wherein the inner lumen has a first, outer diameter and the central bore has a second, inner diameter, wherein the first, outer diameter is substantially equal to the second, inner diameter.

7. The cryoablation catheter of claim 1, wherein the inflow bore and the thermocouple bore are spaced angularly apart along a circumference of the isolation guide.

8. The cryoablation catheter of claim 1, wherein the inflow bore extends parallel to the central bore.

9. The cryoablation catheter of claim 1, wherein the thermocouple bore extends parallel to the central bore.

10. The cryoablation catheter of claim 1, wherein both the inflow bore and the thermocouple bore extend parallel to the central bore.

11. The cryoablation catheter of claim 1, wherein the isolation guide has a length of between 0.03" and 0.08".

12. A method of manufacturing a cryoablation catheter comprising:
- inserting an inner lumen into a central bore of an isolation guide;
- inserting an inflow pipe into an inflow bore of the isolation guide, the inflow pipe including a plurality of radially extending inflow ports;
- inserting a thermocouple wire into a thermocouple bore of the isolation guide, the thermocouple wire having a measuring tip configured to measure a temperature;
- positioning the isolation guide such that the plurality of inflow ports and the measuring tip are positioned outside of the isolation guide; and
- securing the isolation guide relative to the inner lumen, the inflow pipe, and the thermocouple wire.

13. The method of claim 12, further comprising forming the isolation guide from a radiopaque material.

14. The method of claim 12, further comprising securing the inner lumen within the central bore of the isolation guide with adhesive.

15. An isolation guide for a cryoablation catheter, the isolation guide comprising:
- a prismatic outer profile including a first axial end face and a second axial end face, the second axial end face disposed opposite the first axial end face;
- a central bore extending between the first axial end face and the second axial end face, the central bore configured to receive an inner lumen of the cryoablation catheter therein;
- an inflow bore extending between the first axial end face and the second axial end face, the inflow bore configured to receive an inflow pipe of the cryoablation catheter therein; and
- a sensor bore extending between the first axial end face and the second axial end face, the sensor bore spaced from the inflow bore so as not to intersect the inflow bore, the sensor bore configured to receive a sensor of the cryoablation catheter therein.

16. The isolation guide of claim 15, wherein the isolation guide is formed of a radiopaque material.

17. The isolation guide of claim 15, wherein the inflow bore and the sensor bore are spaced angularly apart along a circumference of the isolation guide.

18. The cryoablation catheter of claim 15, wherein the inflow bore extends parallel to the central bore.

19. The cryoablation catheter of claim 15, wherein the sensor bore extends parallel to the central bore.

20. The cryoablation catheter of claim 15, wherein both the inflow bore and the sensor bore extend parallel to the central bore.

* * * * *